United States Patent [19]

Nakayama et al.

[11] 4,267,202

[45] May 12, 1981

[54] METHOD FOR MODIFYING THE SURFACE PROPERTIES OF POLYMER SUBSTRATES

[75] Inventors: Hiroyuki Nakayama; Tsuguo Nezu, both of Hiratsuka, Japan

[73] Assignee: Kansai Paint Co., Ltd., Japan

[21] Appl. No.: 40,672

[22] Filed: May 21, 1979

[30] Foreign Application Priority Data

Jun. 9, 1978 [JP] Japan ................................ 53-69679

[51] Int. Cl.³ .............................................. B05D 3/06
[52] U.S. Cl. ...................................... 427/40; 427/44; 427/54.1; 430/532
[58] Field of Search ....................... 96/87 R; 430/532; 427/40, 44, 54.1

[56] References Cited

U.S. PATENT DOCUMENTS

| | | | |
|---|---|---|---|
| 2,956,899 | 10/1960 | Cline | 427/44 |
| 3,449,154 | 6/1969 | Katz | 427/40 |
| 3,555,000 | 1/1971 | Piazza | 427/40 |
| 3,607,345 | 9/1971 | Thomas et al. | 96/87 R |
| 3,630,742 | 12/1971 | Crawford | 96/87 R |
| 3,860,427 | 1/1975 | Matsuo et al. | 96/87 R |
| 4,055,685 | 10/1977 | Bayer et al. | 96/87 R |
| 4,135,932 | 1/1979 | Mann | 96/87 R |

FOREIGN PATENT DOCUMENTS

50-107078  8/1975  Japan ................................ 427/40

*Primary Examiner*—Jack P. Brammer
*Attorney, Agent, or Firm*—Ostrolenk, Faber, Gerb & Soffen

[57] ABSTRACT

A method for modifying the surface properties of polymer substrates which is expedient and effective to give printability, adhesiveness and other desirable properties to the surfaces of polymer substrates is set forth. The method comprises the steps of: subjecting the surfaces to electric discharge treatment, then applying a photopolymerizable composition to the surfaces and irradiating the layer of photopolymerizable composition on the substrate surfaces with actinic rays, thereby photografting the radically polymerizable compound contained in the photopolymerizable composition to the surfaces of the polymer substrates.

8 Claims, No Drawings

METHOD FOR MODIFYING THE SURFACE PROPERTIES OF POLYMER SUBSTRATES

BACKGROUND OF THE INVENTION (1) Field of the Invention

This invention relates to a method for modifying the surface properties of polymer substrates. More particularly, the invention relates to the above-mentioned method which can be carried out rapidly and effected evenly to the surfaces of polymer substrates by subjecting the polymer substrate surface to electric discharge treatment and then photo-grafting radically polymerizable compounds to the polymer substrate surfaces.

(2) Description of the Prior Art

It has been important for widening the uses of polymers and heighten the utility values of polymers to vary only the surface properties of the polyemrs without changing their own mechanical, optical and other properties. For example, since the surface of polyolefin substrate has a large non-polar property, there are several problems in its adhesiveness, printability, adaptability for coating and so forth. In order to solve these problems, there have been tried various kinds of surface treatment methods such as corona discharge treatment, oxidation treatment, frame treatment, surface grafting treatment using radioactive rays and surface coating. These methods are, however, not always satisfactory in view of their effects and expense. In the methods of the corona discharge treatment, oxidation treatment, flame treatment and radiation treatment, the polymer substrates themselves are subject to the influences of the treatments, for example, the optical properties and the mechanical properties of the substrates are adversely affected. Furthermore, in the corona discharge treatment, the effect of the treatment is small and the uniformity and durability of the treatment are poor. In the surface grafting treatment using radioactive rays, even though products of high quality can be obtained, the operation of the treatment is complicated and the treatment is expensive. Further, the surface coating method is disadvantageous not only in that the adhesiveness between the coated layer and the surface of polymer substrate is not good but also in that the optical property and the mechanical property which are inherent to the polymer substrate are lost because of the double layer structure of the coated layer and the polymer substrate having different properties.

In order to eliminate the above-mentioned disadvantages, the present inventors have already proposed new treatment methods for modifying the surfaces of polymer substrates by photochemical graft reaction, for example, in Japanese Published Unexamined Patent Application (Kokai Tokkyo Koho) Nos. Sho. 52-148564 (1977) and Sho. 52-152972 (1977). In these methods, the surface properties of polymer substrates are modified by causing the photochemical graft reaction of radically polymerizable compounds to the surface of polymer substrate by applying actinic rays. However, the following problems are left unsolved. That is, in the first place, the treatment must be done rapidly in order to enhance the productivity. Especially, as described later, when the active sites which are necessary for the graft reaction are few on the surface of polymer substrates, it is necessary to irradiate with them actinic rays for a long time. Secondly, since the majority of photopolymerizable compositions containing radically polymerizable compounds have polarity (solubility parameters are large), the wetting property of the compositions to the non-polar polymer substrates (solubility parameters are small) or the polymer substrates of high crystallizing property, are poor, so that the rate of photochemical graft reaction becomes low and the treatment is liable to become uneven due to partial cissing. Furthermore, it is necessary to use thickening agents, surface active agents or solvents in order to prevent cissing.

BRIEF SUMMARY OF THE INVENTION

Taking the above facts in the prior art into consideration, the present inventors have carried out eager and extensive studies and, as the result, the improved method of the present invention has been accomplished in which the surfaces of polymer substrates can be modified quite rapidly and evenly without using photopolymerizable compositions of complicated ingredients.

It is, therefore, the primary object of the present invention to provide an improved method for modifying the surface properties of polymer substrates which can be easily performed in a short period of time without difficulty.

Another object of the present invention is to provide such the method for modifying the surface properties of polymer substrates which gives even and large effect to the treated surfaces and the treatment effect lasts long.

A further object of the present invention is to provide the method for modifying the surface properties of polymer substrates which can be performed at low cost.

A still further object of the present invention is to provide the method for modifying the surface properties of polymer substrates which does not cause any changes in several properties of treated polymer substrates except the surface properties thereof.

In accordance with the method of the present invention, the surfaces of polymer substrates are previously subjected to electric discharge treatment and the treated surfaces are then applied with a photopolymerizable composition which is followed by the irradiation of actinic rays. Thus, the radically polymerizable compounds contained in the photopolymerizable composition are grafted to the surfaces of polymer substrates. With the above previous electric discharge treatment, the active sites which are necessary to the graft reaction are increased on the surfaces of polymer substrates, and therefore, the rate of graft reaction can be accelerated. Furthermore, the polarity of the polymer surfaces is increased so that the wetting property of the polymer surfaces relative to the photopolymerizable composition is increased which results in the increase of the rate of the graft reaction. At the same time, the graft reaction can be done uniformly on the polymer surfaces. From the above reason, it has become possible to perform the treatment method of the present invention rapidly and evenly.

DETAILED DESCRIPTION OF THE INVENTION

The polymer substrates to which the method of the present invention is applied are those which produce, on the main chains or branched chains of the polymer substrates, polymerizable active sites which are able to initiate the polymerization by the radicals, ion radicals or exited species produced photochemically, in the photopolymerizable composition. Therefore, the conditions for the polymer substrates to be satisfied are: (1)

the polymers have carbon-carbon double donds in their main chains or branched chains, or (2) the polymers have hydrogen atoms which are susceptible to hydrogen pull reaction, that is, the chains of polymers have the carbon atoms each bonding to one hydrogen atom and the dissociation energy of the bond between the hydrogen atom and the carbon atom is not more than 80 Kcal/mol.

Among such the polymer substrates, hydrophobic polymer substrates are exemplified in the above-mentioned Japanese Publication Unexamined Patent Application (Kokai Tokkyo Koho) Nos. Sho. 53-148564 and Sho. 52-152972 (1977). Exemplified as the polymer substrates having the former condition (1) are polybutadiene, polyisoprene; polypentadiene; the copolymers which are made from two or more kinds of the monomers for producing the above polymers; two component or multicomponent copolymers which are produced by using one or more members of the above-mentioned monomers and a comonomer or comonomers of ethylene, propylene, isobutene, vinyl chloride, vinyl acetate, styrene, acrylic esters, methacrylic esters, acrylonitrile and methacrylonitrile; unsaturated polyesters; unsaturated polyepoxides; unsaturated polyamides; unsaturated polyacryls and the internally cross-linked products of the above polymrs. Further, as the polymer substrates which meet with the above condition (2), there are exemplified by polystyrene; polypropylene; polyvinyl chloride; polyvinyl carbazole; polyacrylonitrile, polyacrylic esters; polyvinyl acetate; the copolymers which are composed of two or more kinds of the monomers for producing the above polymers; two component or multi-component copolymers which are made from one or more of the above monomers and a comonomer or comonomers of methacrylic ester, methacrylonitrile, butadiene and isoprene; the copolymer of vinyl acetate and ethylene; polyester; polyamide; polyurethane; polycarbonate; polyepoxide; polyethylene and the internally cross-linked products of these polymers.

The method of the present invention is quite effective with non-polar hydrocarbon polymer substrates such as polypropylene polybutadiene, polyisoprene, polypentadiene and polystyrene, polyethylene which is non-polar and has few active sites necessary for the graft reaction, and polyester having high degree of crystallinity.

The above-mentioned polymer substrates may also be those containing pigments, fillers and the like. Even though there is no restriction in connection with the shapes of polymer substrates, the polymer substrates in the forms of films or sheets are advantageous in industrial practice since they can be treated in a continuous process.

As the electric discharge treatment in the method of the present invention, any of corona discharge treatment, glow discharge treatment and arc discharge treatment can be employed. Among them, the glow discharge treatment is most preferable because the treatment can be done in a short time without causing the changes of mechanical property and optical property of the polymer substrates.

The corona discharge treatment itself is well known, and can be performed by using a high frequency generating device and by properly choosing the discharge conditions such as the treating voltage, the treating current, the treating time, or the distance between the electrodes. Usually, a voltage of about 0.1 to 20 kV, a treating time of $10^{-3}$ to $10^4$ second, an interelectrode space of about 0.1 to 5 mm, and a power consumption of about 0.01 to 100 KW.sec. per $m^2$ of the film can be emploued.

Usually the corona discharge treatment is carried out at room temperature in air, but if desired, it may be carried out in an atmosphere of other gases such as nitrogen, carbon monoxide or monomer. Further, if desired, the temperature may be raised or lowered within a range of $-50°$ C. to a point $10°$ C. lower than the softening point of the polymer substrate.

The glow discharge used in the method of the present invention can be generated by the well known method. That is, in the glow discharge, electrons are liberated from a cathode by the impact of gas particles or photons and the glow discharge is obtained by generating plasma by means of the electric discharge of a gas at a pressure of several mmHg in a reaction vessel of a reduced pressure.

The glow discharge that is advantageously employed in the method of the present invention, is generated under the conditions of a current frequency of 1 to $10^7$ kHz, preferably 10 to $10^3$ kHz; an electric power of 5 to 1000 W; and the pressure of a reaction vessel of 0.01 to 10 Torr, desirably 0.1 to 5 Torr.

The device for generating the glow discharge is composed of a reduced pressure reaction vessel having an exhaust port cannected to a vacuum pump and an inlet port for receiving a surrounding gas, and electric devices for generating plasma by glow discharge in the reaction vessel. The reaction vessel is generally made of glass or metal and is durable to high vacuum. At least a portion of the reaction vessel is preferably made transparent in order to observe the inside of the vessel. The reaction vessel is provided with electrodes or an induction coil to effect the glow discharge. The electrodes may be attached to any of the inside or outside of the reaction vessel, while the induction coil is generally attached to the outside of the reaction vessel. In the case of an internal electrode device, both d.c. and a.c. currents can be used, however, in the case of an external electrode device, a.c. currents are generally used. To an induction coil device, a.c. currents of 1 kHz in frequency are supplied in general cases. When the electric discharge is performed by using internal electrodes, the electrodes are liable to be stained during the discharging, and therefore, it is desirable to use external electrodes.

As the reactive gases for maintaining the pressure of reaction vessel at the above-mentioned 0.01 to 10 Torr, during the discharging, all gases such as air, oxygen, carbon dioxide, nitrogen, formaldehyde and hydrogen peroxide, and oxygen containing compounds having low boiling points such as formic acid, acetic acid, propionic acid, methanol and ethanol are used solely or as a mixture. Further, gases containing no oxygen such as hydrogen, argon, helium, methane and ethane may be used as carrier gases as long as they do not exceed 50% of the above oxygen containing compounds.

In the reaction vessel, the polymer substrates to be treated are disposed in the space between the electrodes, or in the discharging zone of the induction coil, or in the space in which the gas activated by the discharging between the electrodes or the induction coil, moves to the exhaust port. The time of treatment is generally in the range of $10^{-3}$ to $10^4$ seconds.

The arc discharge is carried out by the conventional method at a surrounding gas pressure of 0.1 to 100 atm.

and at a field strength of 0.1 to 30 V/cm. The surrounding gas is selected from air, oxygen, nitrogen, argon and krypton. The Time of treatment is in the range of $10^{-3}$ to $10^4$ seconds.

In the method of the present invention, after the discharge treatment of the polymer substrates, the substrates are brought into contact with a photopolymerizable composition containing radically polymerizable compounds and they are applied with the irradiation of actinic rays.

For bringing the polymer substrates into contact with the photopolymerizable composition, any of commonly known methods may be employed. For example, the polymer substrates are immersed into a photopolymerizable composition or they are coated with the photopolymerizable composition. Furthermore, the coating film of the photopolymerizable composition may be dried or it may be melted on the surfaces of the polymer substrates.

The photopolymerizable composition that is used in the method of the present invention can be radically polymerized by the application of actinic rays and in addition, it is necessary that the composition does neither dissolve nor deform the surfaces of the polymer substrates.

More particularly, the photopolymerizable composition consists essentially of radically polymerizable compounds, and if necessary, photosensitizers, thickness agents, surface active agents, solvents and so forth. Exemplified as the radically polymerizable compounds are maleic anhydride, acrylic amide, methacrylic amide, N-methyl acrylic amide, N-methyl methacrylic amide, N-ethyl acrylic amide, N-ethyl methacrylic amide, N-propyl acrylic amide, N-propyl methacrylic amide, N-butyl acrylic amide, N-butyl methacrylic amide, N-2-hydroxyethyl acrylic amide, N-2-hydroxyethyl methacrylic amide, N,N-methylene bisacrylic amide, N,N-methylene bismethacrylic amide, N-methylol acrylic amide, acrylic morpholine, methacrylic morpholine, N-propyl hydroxyacrylic amide, N,N-dimethyl acrylic amide, N,N-dimethyl methacrylic amide, N,N-diethyl acrylic amide, N,N-diethyl methacrylic amide, diacetone acrylic amide, acrylic acid, methacrylic acid, 2-hydroxyethyl acrylate, 2-hydroxyethyl methacrylate, diethylene glycol monoacrylate, diethylene glycol monomethacrylate, triethylene glycol monoacrylate, triethylene glycol monomethacrylate, polyethylene glycol monoacrylate, polyethylene glycol monomethacrylate (the molecular weight of polyethylene glycol is not less than 170), 2-hydroxypropyl acrylate, 2-hydroxypropyl methacrylate, 3-hydroxypropyl acrylate, 3-hydroxypropyl methacrylate, glycerol monoacrylate, glycerol monomethacrylate, polyethylene glycol diacrylate, polyethylene glycol dimethacrylate (the molecular weight of polyethylene glycol is not less than 170), N-vinyl imidazole, vinylpyridine, N-vinyl piperidone, N-vinyl caprolactam, N-vinyl pyrrolidone, 2-dimethylaminoethyl acrylate, 2-dimethylaminoethyl methacrylate, 2-diethylaminoethyl acrylate, 2-diethylaminoethyl methacrylate, 2-sulfoethyl acrylate, 2-sulfoethyl methacrylate, 3-sulfopropyl acrylate, 3-sulfopropyl methacrylate, p-styrene sulfonic acid, 2-phosphoric ethylene acrylate, 2-phosphoric ethylene methacrylate, 2-phosphoric-1-chloromethylethylene acrylate and 2-phosphoric-1-chloromethylethylene methacrylate. These compounds can be used alone or as a mixture of two kinds or more. Besides the above compounds, hydrophobic compounds such as styrene, acrylic ester, methacrylic ester and vinyl ester can also be used.

In the treating method of the present invention, well known photosensitizers can be used. For example, there are compounds that produce independently free radicals under the application of actinic rays such as benzoin ethers, azobisisobutyronitrile and thiuram compounds; triplet state photosensitizer that produce free radicals by pulling active hydrogen atoms from other moelcules such as benzophenone, acetophenone acetone and methyl ethyl ketone, photo-redox type such as ferric chloride and dye-reduction type such as riboflavin-ascorbic acid. Of these photosensitizers, those that produce free radicals by pulling active hydrogen atoms from other molecules are preferred.

In the case that the polymer substrates are opaque relative to the actinic rays, the actinic rays are irradiated from the side of the applied photopolymerizable composition. If the polymer substrates are transparent to the actinic rays, the actinic rays can be irradiated either from the side of the photopolymerizable composition or from the side of the polymer substrates, or from both sides. In order to prevent the inhibition of graft reaction caused by the oxygen in the air, it is possible to substitute an inert gas for the surrounding air or to cover up the air-contacting surfaces of photopolymerizable composition with oxygen impervious substances.

The wave length of the actinic rays as the energy source of graft reaction is preferably in the range of 250 to 700 nm, and it is more desirable that the actinic rays in such a wave length range do not cause the deterioration of the polymer substrates. Exemplified as the light sources are a mercury lamp, a metal halide lamp, a fluorescent lamp, a xenone lamp, a carbon arc lamp, an incandescent lamp and the sun. Though the irradiation time is different according to the degree of desired modification and the kind of irradiation source, it is generally in the range of several seconds to 24 hours.

According to above mentioned irradiation sources and irradiation time, the energy of actinic rays to be irradiated is generally in the range of $10–10^6$ W.min/m$^2$ calculated from the measurement by an actinometer which is equipped with a photodiode having the highest sensitivity at 365 nm wave length.

In the method of the present invention, after the graft reaction by the application of actinic rays, unreacted photopolymerizable composition and the non-grafted polymer of the radically polymerizable compound are removed from the surfaces of polymer substrates by rinsing with a non-solvent such as water or methanol, and thereby the modification of the polymer substrate surfaces being accomplished. The removal of the above-mentioned composition and polymer may be carried out by well known measures of the mechanical method and dissolution.

In the method of the present invention as described above, it has becomes possible to reduce the cost for modifying the surface properties of polymer substrates with graft reaction by shortening the operation process. It is to be noted, further, that the polymer substrates having the modified surfaces are not only free from the defects of surface properties but also usable for a variety of new purposes. For example, when the hydrophobic surfaces of polyolefin are made hydrophilic by the method of the present invention, the printability, adhesiveness and so forth are much improved which increases the industrial advantages. The above descriptions are only exemplary and besides them, many kinds of uses may be expected.

The method of the present invention will be further described with reference to Examples given below. It should be noted, however, that the present invention is by no means restricted to the following Examples.

EXAMPLE 1

A photopolymerizable composition A was prepared by dissolving 20 g of acrylic amide and 2 g of benzophenone is 30 g of methanol.

A low density polyethylene sheet (trademark: "UBE Polyethylene" made by Ube Industries, Ltd.) having the dimensions of 10 cm in length, 5 cm in width and 0.2 cm in thickness was subjected to glow discharge treatment for 0.5 minute under the conditions of 1 Torr. of oxygen gas and 100 W with using PLASMOD (trademark of the product of Tegal Corp.). After the discharge treatment, the polyethylene sheet was applied with the photopolymerizable composition A by using a bar coater. It was then irradiated for 2 minutes by a 2 KW high pressure mercury lamp (product of ORK Manufacturing Co., Ltd) which was placed 30 cm distance apart from the layer of the photopolymerizable composition. After the irradiation, the non-grafted substances were removed by washing the treated sheet with water and it was then dried. The contact angle with water of the surface of treated polyethylene sheet was 35° (at 23° C. and relative humidity of 60%, the same shall apply hereinafter). The contact angle with water of an untreated surface was 98°.

Meanwhile, since the untreated surface of the polyethylene sheet causes cissing, the photopolymerizable composition A could not be applied uniformly by using the bar coater. In the case that a 5 mm thick layer of the photopolymerizable composition A was formed by using a spacer, it was necessary to irradiate for more than 10 minutes so as to reduce the contact angle with water of the treated surface below 40°.

EXAMPLE 2

A photopolymerizable composition B was prepared by dissolving 20 g of acrylic acid, 2 g of benzophenone and 8 g of polyvinylpyrrolidone (number average molecular weight: about 10,000) in 30 g of acetone.

A polypropylene sheet (trademark: "UBE Polypropylene" made by Ube Industries, Ltd.) of 10 cm in length, 5 cm in width and 0.2 cm in thickness was subjected to the discharge treatment in like manner as the foregoing Example 1. After the discharge treatment, the photopolymerizable composition B was applied to the above sheet by using a bar coater and then, in like manner as Example 1, light irradiation and water washing were carried out. The contact angle with water of the treated polypropylene surface was 38°. The contact angle with water of an untreated surface was 101°.

Meanwhile, since the untreated surface of the polypropylene sheet causes cissing, the photopolymerizable composition B could not be applied evenly by using the bar coater. In order to coat the composition uniformly, a ten-fold quantity of polyvinylpyrrolidone was required and 10 minutes or more of the light irradiation was necessary.

EXAMPLE 3

A photopolymerizable composition C was prepared by dissolving 20 g of 2-hydroxyethyl acrylate and 2 g of benzophenone in 30 g of methanol.

A polyvinyl chloride film (trademark: "Vinyfoil" made by Mitsubishi Plastics Industries Limited) of 10 cm in length, 5 cm in width and 50μ in thickness was subjected to discharge treatment in like manner as Example 1. After the discharge treatment, the treated film was applied with the photopolymerizable composition C with using a bar coater, which as followed by the light irradiation and water washing in like manner as Example 1. The contact angle with water of the surface of treated polyvinyl chloride film was 42°. The contact angle with water of an untreated surface was 92°.

EXAMPLE 4

A polybutadiene film (trademark: "Neowrap" made by Japan Synthetic Rubber Co., Ltd.) of 60 cm in width and 100μ in thickness was subjected to corona discharge treatment at the conditions of 5.7 KHz, 200 V and 8 A, and at a rate of 5 m/min, by using a corona discharge treatment machine (model: "HFS-801" made by Kasuga Denki Co., Ltd.). After the treatment, the film was applied with the photopolymerizable composition A by using a roll coater and the coated surface was then irradiated with a 2 kW high pressure mercury lamp which was placed 30 cm distance apart from the coated surface. After the light irradiation, the coated surface was washed with water so as to remove non-grafted substances. The contact angle with water of the surface of polybutadiene film was 45°. The contact angle with water of an untreated surface was 80°.

The contact angles referred to in the above Examples of the present invention were measured as follows:

Under the conditions of a temperature of 23° C. and a relative humidity of 60%, 10 ml of distilled water was dropped on a substrate and after 1 minute, the angle between the substrate surface and the marginal portion of water was measured by using a telescope (contact angle precision measuring device, model: "CA-D" made by Kyowa Scientific Equipment Co., Ltd.).

Although the present invention has been described in connection with preferred examples thereof, many variations and modifications will now become apparent to those skilled in the art. It is preferred, therefore, that the present invention be limited not by the specific disclosure herein but only by the appended claims.

What is claimed is:

1. A method for modifying the surface properties of polymer substrates which comprises the steps of:
    subjecting the surfaces of said polymer substrates to glow discharge treatment under the conditions of a current frequency of 1 to $10^7$ kHz, a power consumption of 5 to 1000 W and a pressure of 0.01 to 10 Torr;
    applying a photopolymerizable composition containing a radically polymerizable compound capable of grafting to said surfaces to said treated surfaces of polymer substrates; and
    irradiating said photopolymerizable composition on said surfaces of polymer substrates with actinic rays;
    thereby grafting the radically polymerizable compound contained in said photopolymerizable composition, to the surfaces of said polymer substrates.

2. A method for modigying the surface properties of polymer substrates as claimed in claim 1, wherein said polymer substrates to be treated are polybutadiene; polyisoprene; polypentadiene; copolymers which are produced from two or more of the monomers for producing the above polymers; two component or multicomponent copolymers which are produced by using one or more of said monomers and a comonomer or comonomers of ethylene, propylene, isobutylene, vinyl chloride, vinyl acetate, styrene, acrylic ester, methacrylic ester, acrylonitrile and methacrylonitrile; unsaturated polyesters; unsaturated polyepoxides; unsaturated polyamides; unsaturated polyacryls; internally cross-linked products of these polymers; polystyrene; polypropylene; polyvinyl chloride; polyvinyl carbazole; polyacrylonitrile; polyacrylic ester; polyvinyl acetate; copolymers which are made from two or more kinds of the monomers for producing these polymers; two component or multi-component copolymers which are made from one or more of the latter monomers and a comonomer or comonomers of methacrylic ester, methacrylonitrile, butadiene and isoprene; copolymer of vinyl acetate and ethylene; polyester; polyamide; polyurethane; polycarbonate; polyepoxide; polyethylene and internally cross-linked products of these polymers.

3. A method for modifying the surface properties of polymer substrates as claimed in claim 1, wherein said photopolymerizable composition contains one member or more of radically polymerizable compounds selected from the group consisting of maleic anhydride, acrylic amide, methacrylic amide, N-methyl acrylic amide, N-methyl methacrylic amide, N-ethyl acrylic amide, N-ethyl methacrylic amide, N-propyl acrylic amide, N-propyl methacrylic amide, N-butyl acrylic amide, N-butyl methacrylic amide, N-2-hydroxyethyl acrylic amide, N-2-hydroxyethyl methacrylic amide, N,N-methylene bisacrylic amide, N,N-methylene bismethacrylic amide, N-methylol acrylic amide, acrylic morpholine, methacrylic morpholine, N-propyl hydroxyacrylic amide, N,N-dimethyl acrylic amide, N,N-dimethyl methacrylic amide, N,N-diethyl acrylic amide, N,N-diethyl methacrylic amide, diacetone acrylic amide, acrylic acid, methacrylic acid, 2-hydroxyethyl acrylate, 2-hydroxyethyl methacrylate, diethylene glycol monoacrylate, diethylene glycol monomethacrylate, triethylene glycol monoacrylate, triethylene glycol monomethacrylate, polyethylene glycol monoacrylate, polyethylene glycol monomethacrylate (the molecular weight of polyethylene glycol is not less than 170), 2-hydroxypropyl acrylate, 2-hydroxypropyl methacrylate, 8-hydroxypropyl acrylate, 8-hydroxypropyl methacrylate, glycerol monoacrylate, glycerol monomethacrylate, polyethylene glycol diacrylate, polyethylene glycol dimethacrylate (the molecular weight of polyethylene glycol is not less than 170), N-vinyl imidazole, vinylpyridine, N-vinyl piperidone, N-vinyl caprolactam, N-vinyl pyrrolidone, 2-dimethylaminoethyl acrylate, 2-dimethylaminoethyl acrylate, 2-diethylaminoethyl methacrylate, 2-sulfoethyl acrylate, 2-sulfoethyl methacrylate, 8-sulfopropyl acrylate, 8-sulfopropyl methacrylate, p-styrene sulfonic acid, 2-phosphoric ethylene acrylate, 2-phosphoric ethylene methacrylate, 2-phosphoric-1-chloromethylethylene acrylate, and 2-phosphoric-1-chloromethylethylene methacrylate, styrene, acrylic esters, methacrylic esters and vinyl esters.

4. A method for modifying the surface properties of polymer substrates as claimed in claim 1, wherein said photopolymerizable composition further contains at least one member of photosensitizers, thickening agents, surface active agents and solvents.

5. A method for modifying the surface properties of polymer substrates as claimed in claim 1, wherein said polymer substrate is polyethylene and said photopolymerizable composition comprises acrylic amide and benzophenone.

6. A method for modifying the surface properties of polymer substrates as claimed in claim 1, wherein said polymer substrate is polypropylene and said photopolymerizable composition comprises acrylic acid and benzophenone.

7. A method for modifying the surface properties of polymer substrates as claimed in claim 1, wherein said polymer substrate is polybutadiene and said photopolymerizable composition comprises acrylic amide and benzophenone.

8. A method for modifying the surface properties of polymer substrates as claimed in claim 1, wherein said polymer substrate is polyvinylchloride and said photopolymerizable compsition comprises 2-hydroxyethylacrylate and benzophenone.

* * * * *